D. M. SKINNER.
Plate-Lifter.

No. 162,199.                               Patented April 20, 1875.

Witnesses.
S. N. Piper
L. H. Heller

Daniel M. Skinner.
by his attorney
R. H. Eddy

THE GRAPHIC CO.PHOTO-LITH.39 & 41 PARK PLACE,N.Y.

UNITED STATES PATENT OFFICE.

DANIEL M. SKINNER, OF SANDWICH CENTRE, NEW HAMPSHIRE, ASSIGNOR TO HIMSELF AND EZRA GOULD, OF SAME PLACE.

IMPROVEMENT IN PLATE-LIFTERS.

Specification forming part of Letters Patent No. 162,199, dated April 20, 1875; application filed January 20, 1875.

*To all whom it may concern:*

Be it known that I, DANIEL M. SKINNER, of Sandwich Centre, of the county of Carroll and State of New Hampshire, have invented a new and useful Improved Plate-Lifter; and do hereby declare the same to be fully described in the following specification and represented in the accompanying drawings, of which—

Figure 1:
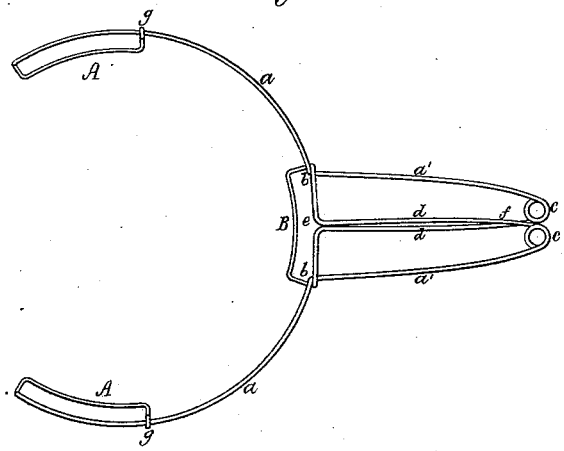
Figure 2:
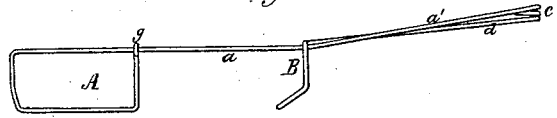
Figure 3:
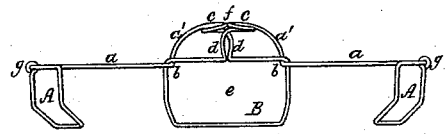

Figure 1 is a top view, Fig. 2 an edge elevation, and Fig. 3 a front view, of it.

In some respects it is analogous to that for which Letters Patent No. 65,616, dated June 11, 1867, were granted to me, it being constructed of wire, and in one piece, although it need not necessarily be made of one piece only, but it may be formed of two or more pieces of wire. It is also for a like purpose—viz., for lifting and removing a dish or plate from a stove-oven, or for supporting such dish or plate and introducing it into an oven or over a fire. In carrying out my present invention, I combine, with the two flexible jaws and their connected shanks, an intermediate shank-clasp and plate-supporter, to perform the office not only of aiding the jaws in holding a plate, but of steadying the handle portions of the jaw-shanks.

In the drawings, the jaws are shown at A A as composed of wire and having curved wire shanks $a\ a'$. Each of these shanks $a\ a'$ is bent at an obtuse angle, as shown at $b$, where it goes through the eye of the clasp B. Next, each wire is bent around spirally, as shown at $c\ c$, and lapped across itself, and thence continues, as shown at $d\ d$, to the eye or clasp $e$ of the portion B. In constructing the implement, a piece of wire of sufficient length is first to be bent at and near its middle, so as to constitute the eye B, having the form as represented, after which it is to be curved, as shown at $d\ d$, and crossed upon itself, as shown at $f$. Next, each of the two shank portions of the wire is to be bent spirally, as shown at $c$, and next as represented at $a'$, and run through the eye $e$, and bent as shown at $b$ and $a$, and next bent to form the jaws A. Finally, at the end, it is to be hooked around the part $a$, in manner as shown at $g$, the wire thus being converted into a plate-lifter, provided with the intermediate shank-clasp and plate-supporter B, composed of the eye $e$, and its shank parts $d\ d$ projected from the springs $c\ c$ of the parts $a'\ a'$, as shown. The purposes of the said shank-clasp and plate-supporter B are as hereinbefore mentioned, and they will be more clearly understood in using the plate-lifter.

I do not herein claim a plate-lifter made of wire, in manner as represented in my said Patent No. 65,616.

I claim—

As a new manufacture, the new plate-lifter, substantially as described, consisting of the jaws A A, and their shanks and handle parts $a\ a'$, in combination with the intermediate shank-clasp and plate-supporter B, all being composed of wire, bent substantially as specified.

DANIEL M. SKINNER.

Witnesses:
 W. M. WEED,
 LUTHER D. SAWYER.